United States Patent
House

(10) Patent No.: US 8,239,279 B2
(45) Date of Patent: Aug. 7, 2012

(54) AUCTION METHOD INVOLVING PRE-SALE OF AUCTION CURRENCY DRAFTS

(76) Inventor: John J. House, Coppell, TX (US)

( * ) Notice: Subject to any disclaimer, the term of this patent is extended or adjusted under 35 U.S.C. 154(b) by 250 days.

(21) Appl. No.: 12/626,456

(22) Filed: Nov. 25, 2009

(65) Prior Publication Data

US 2011/0125604 A1 May 26, 2011

(51) Int. Cl.
*G06Q 30/00* (2006.01)
(52) U.S. Cl. .................................................. 705/26.3
(58) Field of Classification Search ................. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | | |
|---|---|---|---|
| 7,778,869 B2 * | 8/2010 | Jain et al. ................... | 705/14.14 |
| 2004/0193489 A1 * | 9/2004 | Boyd et al. .................. | 705/14 |
| 2008/0313027 A1 * | 12/2008 | Jain et al. ................... | 705/14 |
| 2009/0076926 A1 | 3/2009 | Zinberg et al. | |
| 2010/0332275 A1 * | 12/2010 | Walsh et al. ................ | 705/7 |

OTHER PUBLICATIONS

Pinker et al. "Managing Online Auctions: Current Business and Research Issues", Management Science, vol. 49, No. 11, Nov. 2003, pp. 1457-1484.*

* cited by examiner

*Primary Examiner* — Naeem Haq
(74) *Attorney, Agent, or Firm* — David W. Carstens; Jeffrey G. Degenfelder; Carstens & Cahoon, LLP

(57) ABSTRACT

A computerized system and method for conducting electronic online auctions, which includes the presale of auction currency drafts for subsequent use at a specific auction site. The system includes a centralized controller which confirms the purchase of the auction credits and credits the bidder's account for use at a specific auction website. The auction credits are subsequently assigned to a specific auction venue. The system supplies inventory to the auction venue based upon a percentage of the total presale credits assigned to each specific auction venue through its affiliated auction sites. In addition, external and historical data may be considered by the system in its analysis regarding the correlation of the inventory characteristics with the venue design parameters.

20 Claims, 7 Drawing Sheets

AUCTION METHOD INVOLVING PRE-SALE OF AUCTION CURRENCY DRAFTS

BACKGROUND OF THE INVENTION

1. Technical Field of the Invention

The present invention relates generally to commerce in goods and more particularly to a computerized system and method for conducting electronic online auctions to maximize the sale of liquidation goods through the pre-sale of auction currency drafts.

2. Description of the Related Art

The Internet is increasingly being used to conduct electronic business. In recent years, Internet-based online auction sites have gained widespread popularity and acceptance. Auctions provide a popular and exciting marketplace for the buying and selling of property. In particular, auctions are often used to sell highly valued properties such as fine art, collectibles, real estate, and luxury items. Currently, bidding for millions of items of virtually limitless variety is conducted through an ever-increasing number of online auction sites. These auction sites offer consumers a convenient way to access a seemingly endless array of merchandise from around the world that can be readily searched, viewed, and purchased online. Furthermore, online auction sites give sellers a readily accessible presence or "storefront" from which to market items to a very large population of potential buyers.

As the popularity of this method of commerce continues to grow, so too have the number of sites and companies which offer online auctions. Presently, there are many different online auction sites which have begun to overlap and compete with one another in terms of listings (including the number and types of merchandise available) and customer base (the number of people viewing and bidding on available goods). A development in the online auction marketplace is that a select few online auction sites currently predominate in terms of merchandise availability and customer base. While such online auction sites have several inherent strengths (e.g., centralized marketplace, wide variety of merchandise, substantial customer base), in certain circumstances they exhibit inherent weaknesses.

For example, one sector of the online auction market which is not well suited to current centralized online auction sites involves the liquidation sale of overstocked or distressed inventory. Liquidation sales arise from a number of sources or channels of commerce. For example, from time to time, manufacturers, wholesalers, retailers and direct sellers find it necessary to liquidate relatively large quantities of homogeneous goods to clear or update inventories. Such liquidation sales offer a number of challenges for the liquidating party. The inherent laws of supply and demand tend to undermine the yield from the liquidation sale of goods in that maximizing the demand for the goods is difficult to maintain when a large quantity of homogeneous goods is suddenly put up for auction.

Moreover, while the online auction market is a proven business model, there are still a large number of people who are hesitant to participate in online liquidation auctions for the fear of damaging their valuable trademarks. A liquidation sale of goods with valuable brand names and trademarks has the potential to damage the overall brand name or trademark by diminishing the market value of the brand name or trademark in the minds of consumers. Oftentimes, manufacturers and retailers would rather destroy the goods rather than diminish the value of the brand name or trademark through overexposure in a liquidation auction.

Another sector of the online auction market that is not well suited to current centralized online auction sites are charity auctions, which tend to be problematic on a number of levels. Charity auctions typically require volunteers to first solicit businesses and individuals for donations of goods and services for subsequent auction. Oftentimes, such solicitations results in a mixed bag of auction items, which may undermine the monetary success of the auction. Thus, at the outset, the success of an auction is inherently dependent upon the ability of its volunteers to solicit quality merchandise or services. This oftentimes causes needless anxiety to be thrust upon volunteers tasked with soliciting businesses and individuals. Moreover, the businesses and individuals solicited for auction items, oftentimes end up attending or participating in the actual auctions as bidders, which may further limit the expected bids.

Once the solicited items and services have been procured, the charity auction must then catalog the donated items for display at an online auction site. While the high transaction costs inherent with setting up an online auction site may be offset by volunteers or even utilizing an online auction service, the unique donated items must still be photographed and described for each auction. Even with volunteer assistance, the transaction costs may simply be too high for smaller charity auctions having limited participants and items for auction.

From the foregoing, it can be appreciated that there is a need for an improved auction system for handling online charity auctions. To this end, there is a need for an effective online auction business model that provides a simpler, more efficient system for handling all sizes of charity auctions.

SUMMARY OF THE INVENTION

The present invention overcomes many of the disadvantages of prior art online auctions. The present invention comprises a computerized system and method for conducting electronic online auctions, which creates a perception of scarcity in the marketplace enhancing the demand for and marketability of the goods while minimizing the exposure time of the goods in the marketplace. The present invention improves the efficiency for conducting the liquidation sale of goods by directing the goods to a plurality of separate and distinct auction venues having specific market parameters which correlate to characteristics of the goods. In particular, it improves the ease and effectiveness of conducting charity auctions by providing organizers of charity auctions with a personalized auction site and a ready-made inventory of quality goods that are custom tailored for each auction site. The present invention also provides suppliers with a dynamic market for expeditiously liquidating merchandise without undue exposure of their goods to the general market.

In a preferred embodiment, the method of the present invention is implemented on a network of auction sites under common control. The auction network includes an inventory of goods, which is supplied to the auction network from either a centralized source or a plurality of sources operating in conjunction with a centralized auction network controller. The inventory is comprised of merchandise supplied for liquidation auction by manufacturers, wholesalers, retailers and direct sellers. All items of merchandise comprising the inventory are registered with a centralized auction network controller where it is cataloged in a scheduling database. Each inventory item is defined by one or more characteristics, which define certain aspects of the inventory item. For example, inventory characteristics may include aspects such as product category, demographic profiles, price points, number of available units and maximum length of auction.

The centralized auction network controller further establishes a plurality of online auction venues. Each auction venue is established based upon one or more design parameters, which define the auction framework at a particular venue. For example, in one embodiment the venue design parameters may target certain product categories, demographic profiles, price points, minimum sales volume, audience size and length of auction.

Each auction venue is connected to one or more auction websites that display the items for auction at its respective venue. Bidders interact with the auction venue through their respective auction websites. While auction websites may be owned by third parties, the auctions displayed on them are controlled by the centralized network controller through the auction venue. Each of the venue's respective auction websites may further comprise a unique graphical appearance (i.e., a template, theme or skin) so that each website appears to be a custom stand-alone online auction site.

The centralized auction network controller supplies inventory to each auction venue based upon an analysis and correlation of the inventory characteristics with the venue design parameters. In addition, the centralized auction network controller may also use external and historical data in its analysis regarding the correlation of the inventory characteristics with the venue design parameters.

The computerized method and system for conducting electronic online auctions of the present invention is easily scalable on both its supply and demand end. The liquidation sale of merchandise can be controlled by limiting the amount of available merchandise items supplied to each auction venue. Furthermore, the metering of the auction merchandise can be controlled as a function of both the product characteristic, auction parameters, external and historical data. Moreover, the merchandise can be targeted to specific demographic and economic groups that will generate the highest bid. In addition, historical telemetry generated by previous sales of inventory having similar characteristics at auction venues having similar parameters may be used subsequently to predict auction selling trends and predicted yields.

The method of the improved auction system includes the presale of auction currency drafts (i.e., auction credits) for subsequent use at a specific auction site. The centralized controller confirms the purchase of the auction credits with the bidder and credits the bidder's account for use at a specific auction website. The centralized controller further assigns the auction credits to a specific auction venue. The centralized controller then supplies inventory to the auction venue based upon a percentage of the total presale credits assigned to each specific auction site assigned to each auction venue and an analysis and correlation of the inventory characteristics with the venue design parameters. In addition, the centralized controller may also use external and historical data in its analysis regarding the correlation of the inventory characteristics with the venue design parameters. Thus, the auction credits from two or more auction sites may be pooled into a single auction venue resulting in a substantially larger array of auction merchandise for the auction sites than would otherwise be possible.

The computerized method and system for conducting electronic online auctions of the present invention is easily scalable on both its supply and demand end. The liquidation sale of merchandise can be controlled by limiting the amount of available merchandise in any auction to a percentage of presold credits. Furthermore, the metering of the auction merchandise can be controlled as a function of both the product characteristic and the auction parameters. Moreover, the merchandise can be targeted to specific demographic and economic groups that will generate the highest bid. In addition, historical telemetry generated by previous sales of inventory having similar characteristics at auction venues having similar parameters may be used subsequently to predict auction selling trends and predicted yields.

BRIEF DESCRIPTION OF THE DRAWINGS

A more complete understanding of the method and apparatus of the present invention may be had by reference to the following detailed description when taken in conjunction with the accompanying drawings, wherein.

Figure 1:
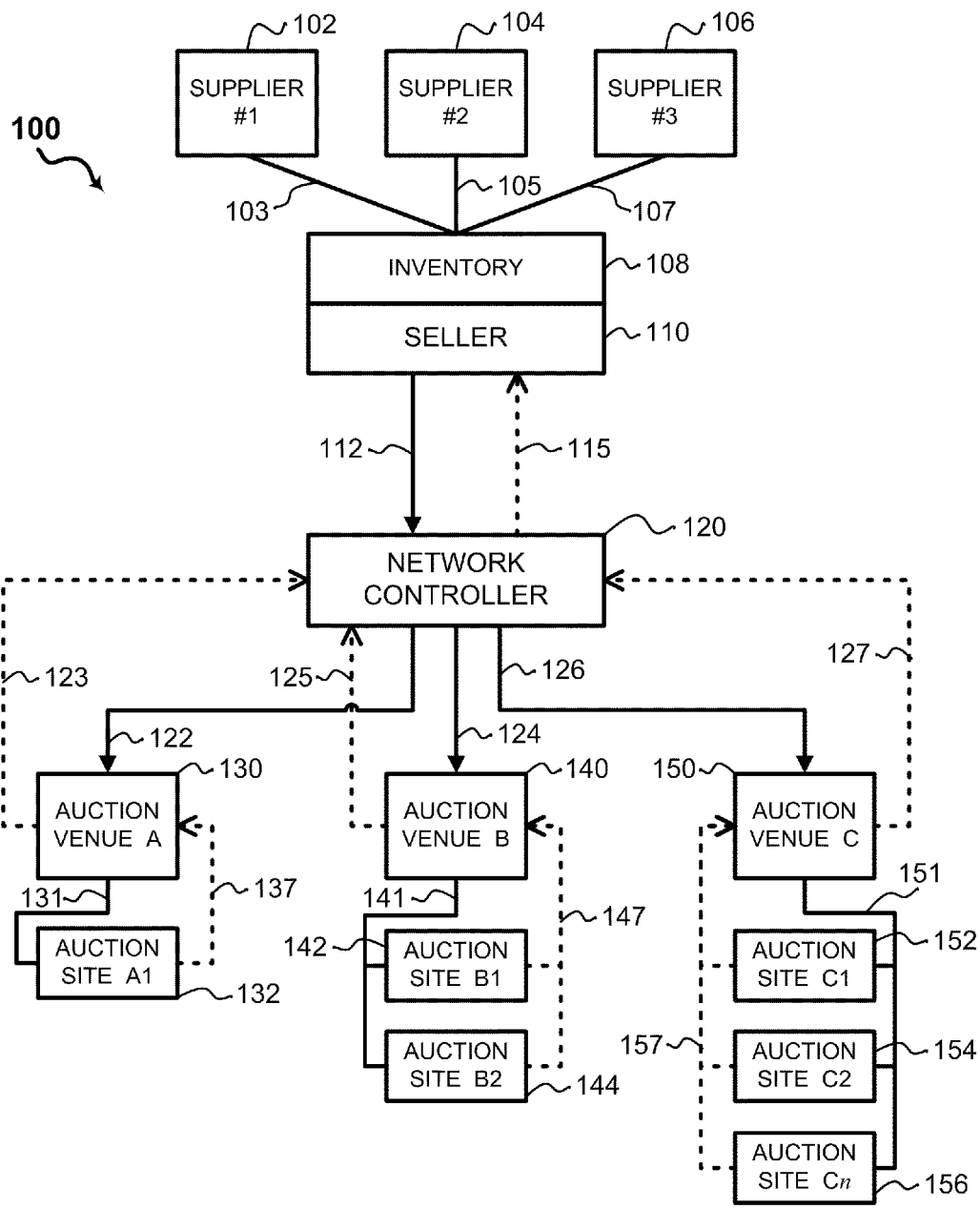
FIG. 1 is a schematic overview of a first embodiment of the computerized system and method for conducting electronic online auctions of the present invention.

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

The system and method of the present invention is preferably implemented on a network of auction sites under common control. For example, with reference to FIGS. 1 and 2, embodiments of the improved computerized system and method for conducting electronic online auctions involving pre-sale of auction currency drafts of the present invention are depicted. The focal point of both embodiments resides in the auction network controller 120, which controls the flow of information and communication between the seller(s) and the various auction venues and their respective auction sites. Information is conveyed between the network controller 120 and the seller(s) via a communications medium such as a network service provider accessed by the participants through, for example, dial-up telephone connections using modems, or direct network connections. In a preferred embodiment of the present invention, the network of auction sites is established through an online system over the Internet. A computer software application is used to manage the overall system. The software application has two components: a supplier/seller (i.e., Supply) component and a user/bidder (i.e., Demand) component. Only the auction network controller 120 is able to interact directly with both components.

In the first embodiment 100 depicted in FIG. 1, a single seller 110 is tasked with assembling a single inventory of goods and services from a plurality of suppliers. It is understood that each supplier may supply either a single item or multiple items of differing characteristics. For example, one supplier 102 may supply a variety of electronic goods to the inventory 110. Another supplier 104 may supply large quantities of a single item (e.g., a designer purse) to the inventory 110. A further supplier 105 may supply a wide variety of distinctive goods (e.g., watches, jewelry, writing implements, etc.) in varying quantities. It is understood that each supplier may have a separate and unique supply contract with the seller 110 regarding the merchandise supplied to the inventory. Alternatively, a general supply contract (e.g., based on a percentage of auction sale or yield) may apply to all or a portion of the suppliers. Ultimately, a large and diverse inventory of goods and services 108 is assembled by the seller 110 to supply a wide variety of goods and services to the various auction venues and respective auction sites. Only the seller 110 communicates with the auction network controller 120 regarding the status of the inventory.

Figure 2:
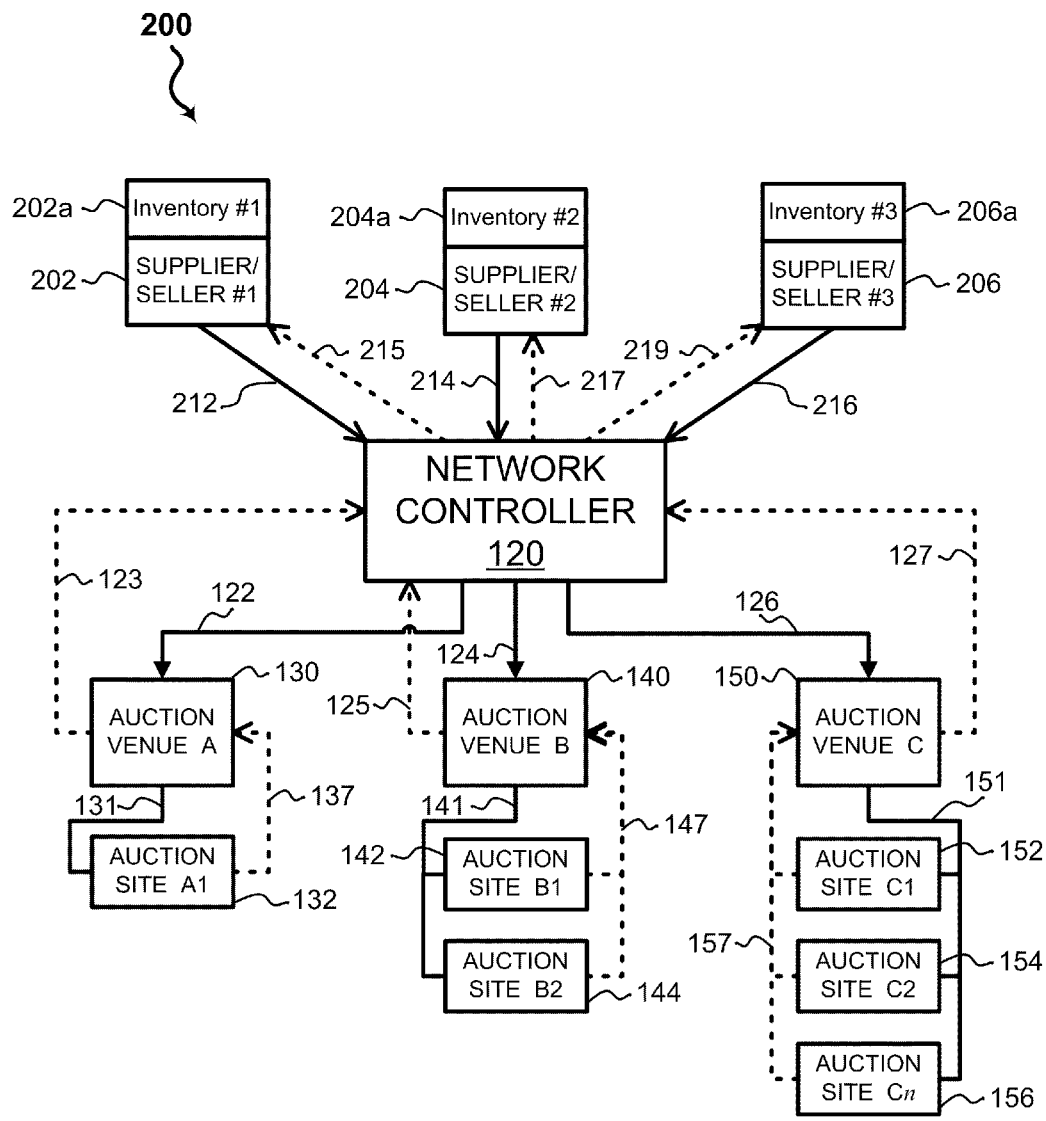
FIG. 2 is a schematic overview of a second embodiment of the computerized system and method for conducting electronic online auctions of the present invention.

In the second embodiment 200 depicted in FIG. 2, a plurality of supplier/sellers (e.g., 202, 204, 206) are tasked with assembling and maintaining separate inventories (e.g., 202a, 204a, 206a) of goods and services available for auction. It is understood that each supplier/seller may assemble its separate inventory for one or more providers of goods and service under separate contractual arrangements. It is further understood that each supplier/seller may supply either a single item of merchandise or multiple items of merchandise having the same or differing characteristics. For example, one supplier/seller 202 may maintain a variety of electronic goods in its inventory 202a. Another supplier/seller 204 may maintain large quantities of a single item (e.g., a designer purse) in its inventory 204a. A further supplier/seller 205 may maintain in its inventory 205a a wide variety of distinctive goods (e.g., watches, jewelry, writing implements, etc.) in varying quantities.

It is understood that each supplier/seller may have a separate and unique contractual arrangement regarding the merchandise supplied to its respective inventory. Alternatively, the supplier/seller may procure its respective inventory in accordance with a general supply contract (e.g., based on a percentage of auction sale or yield) with each of its associated suppliers. Thus, in contrast with the first embodiment 100, which features a centralized inventory provided by a single seller 110, the inventory of the second embodiment 200 of the present invention is distributed amongst several supplier/sellers (e.g., 202, 204, 206).

Moreover, the centralized auction network controller 120 maintains discrete lines of communication between itself and, each supplier/seller 202, 204, 206. For example, a first supplier/seller 202 transmits 212 and receives 215 information, instructions and data with the auction network controller 120 via a communication link that is distinct from the communication link that permits a second supplier/seller 204 to transmit 214 and receive 217 information, instructions and data with the network controller 120. Likewise, a third supplier/seller 206 transmits 216 and receives 219 information, instructions and data with the network controller 120 via a communication link that is distinct from the communication links discussed previously with regard to the first 202 and second 204 supplier/sellers. Thus, in the second embodiment, the auction network controller 120 controls an inventory which is distributed amongst several supplier/sellers (e.g., 202, 204, 206) by communicating with each supplier/seller via a discrete line of communication. In contrast with the first embodiment 100, wherein the network controller 120 communicates exclusively with a single seller 110 regarding a centralized inventory 108, in the second embodiment 200, the network controller 120 communicates with a plurality of separate supplier/sellers (e.g., 202, 204, 206) regarding their respective inventories (e.g., 202a, 204a, 206a).

Regardless of whether the system of the present invention includes a centralized inventory 108 as shown in the first embodiment in FIG. 1, or a distributed inventory as illustrated in the second embodiment in FIG. 2, the remainder of the system and the method of the system are essentially the same. The ultimate initial goal of each system embodiment is to ensure that the auction network controller 120 has access to a large and diverse inventory of goods and services in order to supply a wide variety of auction items to the auction network's various auction venues and their associated auction sites. Additionally, in accordance with the teachings of the present invention, it is understood that the actual auction items may be physically located at a centralized location or at a plurality of remote locations. Moreover, the goods offered for auction may physically reside at the supplier's location until the auction is completed. Thus, a wide range of management flexibility may be built into the system.

Whether centralized under a single seller or distributed amongst a plurality of supplier/sellers, all merchandise comprising the inventory is registered with the centralized auction network controller 120, where it is cataloged into a scheduling database 160. Upon registration, each item is further categorized by one or more characteristics that define, describe and delineate certain aspects of the auction item in the inventory. Characteristics directed at product category, demographic profiles, price point profiles, number of available units, auction length restrictions, and minimum auction size may be used to categorize each auction item in the inventory. For example, in one embodiment the inventory data file of each auction item is stored in the scheduling database 160 and includes the following information:

PRODUCT CATEGORY

Subcategories
DEMOGRAPHIC INFO

Age
Gender
Income
Education Level
Religion

-continued

ITEM COST
RETAIL PRICE
MINIMUM PRICE POINT
BUY IT NOW PRICE POINT
MAXIMUM LENGTH OF AUCTION
OF AVAILABLE UNITS
MAX UNITS PER AUCTION
MINIMUM PARTICIPANTS/BIDDERS

Typically, the registration of auction merchandise is accomplished by data input from the merchandise seller to the network controller 120. Thus, in the first embodiment of the invention depicted in FIG. 1, the centralized seller 110 registers all auction items in its inventory 108 with the network controller 120; while in the second embodiment of the invention depicted in FIG. 2, each supplier/seller 202, 204, 206 registers the auction items in its respective inventory 202a, 204a, 206a with the network controller 120. Upon registration with the network controller 120, each auction item is assigned a registration mark (e.g., a number or alpha-numeric symbol) and the characteristic data is added to the scheduling database 160.

For ease of use, duplicate auction merchandise may be registered in groupings of like items. For example, if a seller has 100 identical watches it wishes to register into the inventory, they may be registered as a group with each watch having the same characteristics. In this case, each watch is assigned both an individual registration mark and a linking group identifier. In addition, the maximum number of units available to an individual auction may be limiting characteristic of the item.

In a preferred embodiment, the registration of inventory is accomplished through an online website controlled by the network controller 120, which provides standardized data input screens for simplicity and consistency. The data input screens may feature pull down menus with standardized ranges, activation buttons, and fill in the blank portions.

With reference again to FIGS. 1 and 2, the improved computerized system and method for conducting electronic online auctions involving pre-sale of auction currency drafts of the present invention further includes a plurality of auction venues which are controlled by the centralized auction network controller 120. The auction venues are autonomous of one another, but are commonly controlled by the centralized auction network controller 120. Information is conveyed between the network controller 120 and the various auction venues via a communications medium such as a network service provider accessed by the participants through, for example, dial-up telephone connections using modems, or direct network connections. In a preferred embodiment of the present invention, the communications network between the network controller 120 and the auction venues is established through an online system over the Internet.

The centralized auction network controller 120 maintains separate lines of communication between itself and each auction venue. For example, the centralized auction network controller 120 transmits 122 information, instructions and data to a first auction venue 130 and receives 123 feedback information, instructions and data via a communication link that is distinct from the communication link that permits the second auction venue 140 to transmit 125 and receive 124 information, instructions and data with the network controller 120. Likewise, the network controller 120 transmits 126 information, instructions and data to a third auction venue 150 and receives 127 feedback information, instructions and data from the third auction venue 150 via a communication link discussed previously with regard to the first 130 and second 140 auction venues.

The centralized network controller 120 establishes the basic framework of each auction venue based upon one or more design parameters. The venue design parameters identify certain criteria, which broadly delineate the type of merchandise best suited for auction on the site. Venue design parameters may include certain product categories, demographic profiles, price points, minimum sales volume, audience size, traffic volume and length of auction. The venue design parameters greatly affects the marketing framework of an affiliated auction. By way of example, the following chart illustrates a simplified use of venue design parameters to broadly define the basic framework of the auction venues depicted in the Figures:

| VENUE DESIGN PARAMETER | AUCTION VENUE A | AUCTION VENUE B | AUCTION VENUE C |
|---|---|---|---|
| PRODUCT CATEGORY | SPORTING GOODS | LUXURY GOODS | BRIDES |
| Specific | Boats | APPAREL | Apparel |
| Subcategories | Fishing | Women | Food |
| | Firearms | FINE ART | Wedding Sites |
| | | Paintings | Music |
| | | Sculpture | Honeymoon |
| DEMOGRAPHIC INFO | | | |
| Age | 35-45 | 25-70 | 20-35 |
| Gender | Male | Male & Female | Female |
| Social Class | Middle | upper middle | upper middle |
| Education Level | BA | HS - PhD | BA |
| Religion | All | All | All |
| PRICE POINT | $25-$125 | $50-$200 | $300-$700 |
| PRE-SOLD AUCTION CREDIT AMOUNT | $50K | $150K | $55K |
| AUCTION SIZE | 500 | 1,500 | 100 |
| AUCTION LENGTH | 5 days | 2 days | 12 hours |

A review of each venue's design parameters quickly reveals the marketing framework to which each of the venues is directed. For example, venue A is generally directed at sporting goods, venue B is generally directed at luxury, and venue C is generally directed at weddings. Obviously, the more design parameters assigned to an auction venue the greater the marketing customization of the venue. Moreover, a comparison of two venue's design parameters easily demonstrates the marketing divergence between the two venues. For example, venue A is broadly directed at avid sportsmen who are interested in sporting equipment, whereas venue C is generally directed at future happy brides interested planning the wedding of their dreams.

It is further noted that while most venue design parameters are subjectively defined by the centralized network controller 120, others (e.g., sales volume, audience size, price point) may be objectively determined through an analysis of historical data of the auction venue. Indeed, many venue design parameters can be linked to an analysis of historical sales data generated by each particular auction venue. To this end, the centralized network controller 120 also maintains a historical database on each auction venue that records the economic, marketing and demographic data on each item sold at a particular venue. Analysis of this information can be used subsequently to fine tune a venue's design parameters to maximize sales volume and yield. Moreover, the information generated by one venue can be correlated to another venue to fine tune its design parameters. In addition, the analysis of historical sales data may also be used to predict the expected yield for an item of merchandise, in general, or at a venue having similar design parameters.

In a preferred embodiment, the plurality of auction venues are established through an online website controlled by the network controller 120, which provides standardized data input screens for simplicity and consistency. The data input screens may feature pull down menus with standardized ranges, activation buttons, and fill in the blank portions.

With reference again to FIGS. 1 and 2, the improved computerized system and method for conducting electronic online auctions involving pre-sale of auction currency drafts of the present invention further includes a one or more auction websites connected to each auction venue. While auction websites may be owned by third parties, the auctions displayed on them are controlled by the centralized network controller 120 through the respective auction venue. Each auction website is connected to only one auction venue at a time. Bidders interact with the auction venue through its respective auction websites. Information is conveyed between each venue and its respective auction sites by a duplex communications medium such as a network service provider accessed by the participants through, for example, dial-up telephone connections using modems, or direct network connections. In a preferred embodiment of the present invention, the communications link between each venue and its associated auction sites is established through an online system over the Internet.

For example, as shown in the FIGS. 1 and 2, auction venue B 140 transmits 141 identical information, instructions and data to each of its respective auction sites (e.g., B1 and B2) 142, 144. Similarly, each of the auctions sites (e.g., B1 and B2) may transmit 147 feedback information (e.g., bids) to its respective auction venue B 140. Auction venue B 140, in turn, retransmits and displays bid information received from a bidder at one of the auction sites (e.g., B2) to all of its respective auction sites (e.g., B1 and B2).

Figure 3:
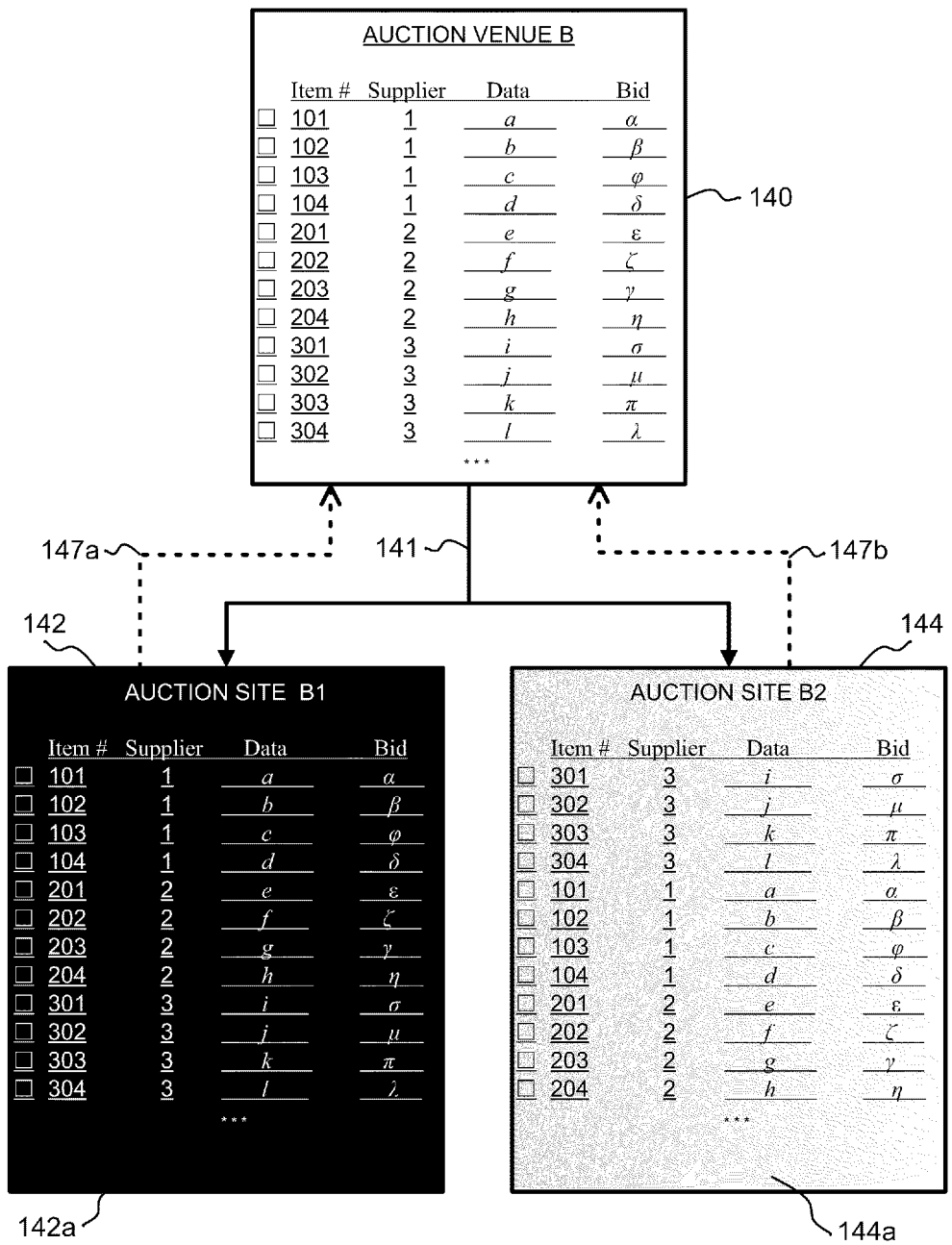
FIG. 3 illustrates the linking displays between an auction venue and its respective auction sites in an embodiment of the computerized system and method for conducting electronic online auctions of the present invention.

In addition, each auction venue's respective auction websites may further comprise a unique graphical appearance (i.e., a template, theme or skin) so that each website appears to be a customized stand-alone online auction site. For example, as shown in FIG. 3, the information at auction venue B 140 is transmitted 141 to both auction site B1 142 and auction site B2 144. Whereas auction site B1 142 includes a display 142a having a graphical appearance comprising white letters on a darkened background, auction site B2 144 includes a display 144a having a graphical appearance comprising black letters on a lightly shaded background. It is further noted that while the information displayed on each auction site is identical, the order of the information may be shuffled to further distinguish the related auction sites from one another. While depicted in the Figures in very simplistic fashion, it is understood that the graphical appearances of auction websites may be greatly enhanced and customized so that each website appears to be a customized stand-alone online auction site.

The computerized method and system for conducting electronic online auctions of the present invention is easily scalable on both its supply and demand end. Moreover, the transaction costs associated with setting up an auction site are very low. In addition, the system inherently provides a great deal of operational flexibility that is highly responsive to changing market conditions. The system is flexible on both is supply side and its demand side. While depicted in the Figures in a simplistic form, it is understood that all major components (i.e., seller, suppliers, venues and auction sites) may be easily replicated, yet customized so as to create a fully integrated network of auctions. However, regardless of how large a network is constructed, control of the auction network of the present invention is concentrated in the centralized auction network controller 120. Such concentration and centralization of control enables the system of the present invention to manage and distribute the inventory much more efficiently.

Figure 4:
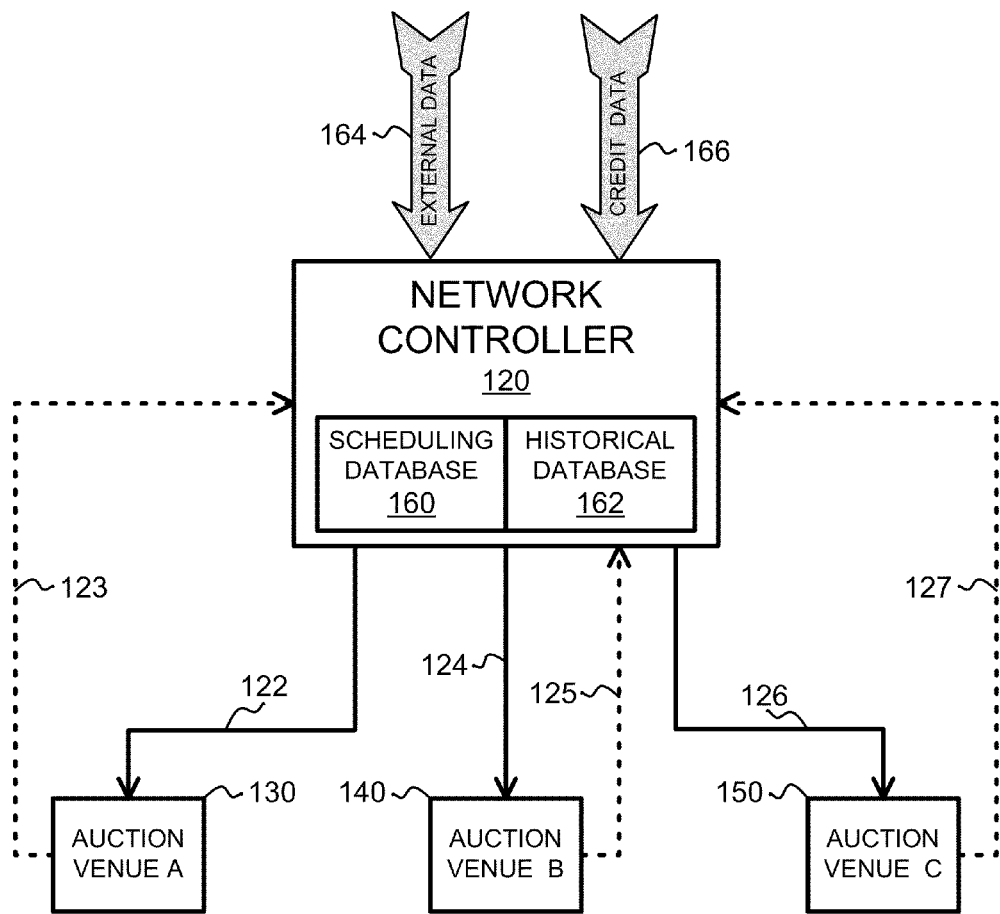
FIG. 4 is a schematic overview illustrating the analysis and correlation processes performed by the controller and the auction venues in an embodiment of the computerized system and method for conducting electronic online auctions of the present invention.

With reference to the Figures and in particular FIG. 4, and in accordance with the method of the present invention, an auction item from a seller's inventory is registered with the network controller 120. The network controller 120 generates an inventory data file on the auction item that includes a registration mark (e.g., a number or alpha-numeric symbol) and at least one characteristic defining the item. The inventory data file is stored in the scheduling database 160. Once an auction item has been registered with the network controller 120 and its characteristics catalogued in an inventory data file in the scheduling database 160, the network controller 120 performs an algorithm which analyzes and correlates the inventory characteristics of the auction item with the design parameters of available auction venues to efficiently distribute the auction item's data file to an auction venue which best suits the auction item so as to maximize its yield in the shortest possible time.

In addition, the network controller 120 can assemble sets or lots of inventory data files for distribution to the various auction venues. Thus, each auction item is evaluated not only in terms of its compatibility and correlation with the parameters of the auction venue, but also in relation to its compatibility and correlation with the total mix of merchandise inventory supplied to an auction venue. Thus, the network controller 120 is able to refine and balance the mix of inventory items supplied to each auction venue to maximize sales yield and generate the highest rate of sale.

The liquidation sale of merchandise can also be managed more efficiently and effectively by controlling the amount of available merchandise supplied to each auction venue and distributing the auction merchandise as widely as possible. For example, if 100 identical watches are supplied to the inventory for liquidation auction, instead of having all 100 watches auctioned on a single auction site, the distribution algorithm may be programmed so that the watches are distributed amongst the entire auction network in order minimize the supply at any single auction. This, in turn, creates a perception of scarcity in the marketplace (i.e., a single auction site) which enhances the demand for and marketability of the goods while minimizing the exposure time of the goods in the marketplace. Thus, the present invention improves the efficiency for conducting the liquidation sale of goods by directing the goods to auction venues having specific market parameters that will generate the highest yield in the least amount of time.

The method of the present invention includes controlling the distribution of auction merchandise as a function of both product characteristic, auction venue design parameters, real time data, external data and historical data. In addition, the selection of auction merchandise for distribution to a particular venue may also be function of the total mix of merchandise supplied to a venue. Thus, each auction item is evaluated not only in terms of its compatibility and correlation with the parameters of the auction venue, but also in relation to its compatibility and correlation with the total mix of merchandise inventory supplied to an auction venue. Consequently, in accordance with the method of the present invention, sets or lots of inventory data files are selected and assembled for distribution to specific auction venues. By controlling the mix of inventory items supplied to each auction venue, supply may be refined and balanced with demand so as to maximize yields and speed of sales.

In addition, the various inventory characteristics and design parameters may be weighted or biased based upon subjective or objective analysis. For example, the merchandise can be targeted to specific demographic and economic groups that will generate the highest yield in the least amount of time. Similarly, sales data in the historical database 162 may be used to refine and adjust the algorithm. In addition, external data 164 such as weather, seasonality (i.e., time of year), day of the week, time of day, economic conditions (e.g., stock market average), current news reporting may also be used to refine and adjust the algorithm. Finally, current real time data (e.g., auction site traffic volume and velocity, percentage of new vs. returning visitor, number of registered bidders, average order size) generated by the auction venues and their associated auction sites may also be used to refine and adjust the algorithm.

Upon completion of the algorithm, the network controller 120 transmits the auction item's data file to a single venue where it is displayed on all auction sites related to the venue. Participants at one or more auction sites may submit bids on the auction item until it is sold or the auction expires. Auction bids are transmitted from each auction site to its respective auction venue where it is re-transmitted to all associated auction sites. Real time bidding information may also be transmitted from the various auction venues back to the network controller 120 where it is used to adjust the algorithm and continually update the historical database 162. Upon completion of the auction, the winning bidder is notified and informed where and how to complete the transaction. The network controller 120 serves as the information nexus between the winning bidder and the seller of the auction item.

The algorithm may also be used to predict auction selling trends and to generate expected yield calculations to prospective sellers based upon historical telemetry generated by previous sales of inventory having similar characteristics at auction venues having similar parameters may be used subsequently to predict auction selling trends, product launching points (i.e., where and when to launch product auctions and at what starting bid and bid increments) and predicted yields.

Charity Auction Using Auction Credits

With reference to the Figures, the method of the present invention will be now be demonstrated on the previously disclosed embodiments of online auction systems 100, 200 in the context of running a charity auction. Representatives of an auction committee engage representatives of the network controller 120 to set-up an online auction site. The online auction site may be established at either an online web address owned or leased by the auction committee or at an online web address leased from the network controller 120. Regardless who owns the online web address, the display of the auction website will be controlled by the network controller 120 for purposes of conducting the auction. In accordance with the previously disclosed teachings of the present system, each auction website may include a unique graphical appearance which serves to customize the appearance of the auction website.

The auction committee representatives are then requested to submit a list of characteristics of merchandise items they wish to have directed to their auction. The list of requested merchandise characteristics is then linked by the network controller 120 to an auction venue directed at similar merchandise characteristics. Alternatively, if the anticipated auction is sufficiently large, a separate auction venue may be customized so as to have the identical merchandise characteristics requested for the auction site. For example, as depicted in FIGS. 1 and 2, auction site A1 132 in linked to a customized auction venue A 130, whereas auction sites B1 142 and B2 144 are linked to and share a common auction venue B 140. The merchandise characteristic framework of auction venue B 140 is compatible with the merchandise characteristics requested from each of its associated auction sites B1 142 and B2 144. It is understood that the merchandise characteristic framework of each auction venue may be designed (and typically is) to be broader or narrower than the requested merchandise characteristics. It is further understood that a perfect match or correlation of merchandise characteristics is not required for an auction site to be linked to a particular auction venue.

In a preferred embodiment, the submission of requested merchandise characteristics is accomplished through an online website controlled by the network controller 120 that provides standardized data input screens for simplicity and consistency. The data input screens may feature pull down menus with standardized ranges, activation buttons, and fill in the blank portions.

Figure 5A:
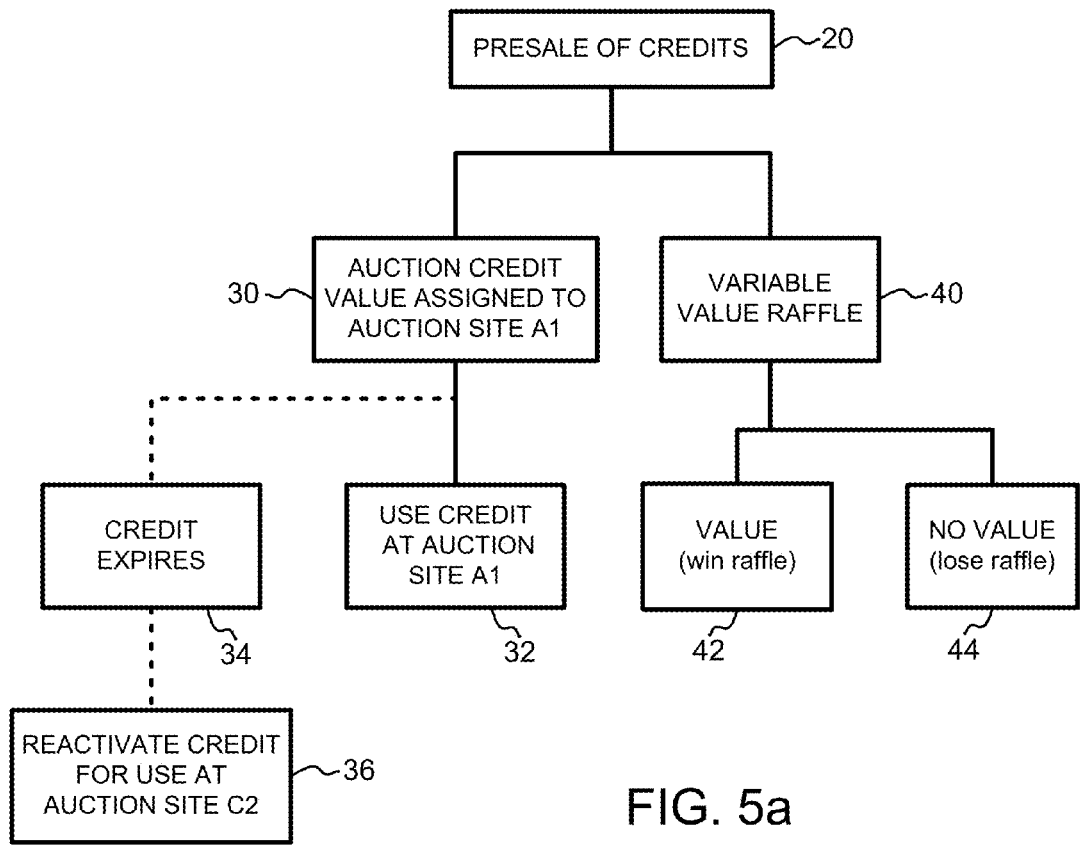
FIG. 5a illustrates a flowchart of the sale and use of auction credits in accordance with the method and system of the present invention.

The next step in the method of the present invention includes the presale of auction currency credits (i.e., auction credits) for subsequent use at a specific auction site. As shown in FIG. 5a, in a preferred embodiment the presale of the credits 20 results in a dual valuation of the credits. The value of each credit includes a cash valuation 30 for subsequent use at an auction 32 and a raffle valuation 40 for subsequent use at a raffle. The auction credit value 30 is assigned to a specific auction site on a specific and fixed date or time period, and for a specific amount. Upon the expiration of the auction time period, the auction credit value typically expires 34. However, in one embodiment, the expired credit may subsequently be reactivated for use at a different auction site 36. In such a case, the auction credit value may be reactivated at its face value or at a discounted level. With regard to the raffle valuation 40, the credit serves as a raffle ticket in a lottery held in conjunction with the auction. Thus, the credit may have added value 42 if the raffle ticket is a winner or no added value 44 if the ticket is a loser.

Figure 5B:
FIG. 5b illustrates a sample auction credit in accordance with the method and system of the present invention.

The auction credits may be purchased online or preferably through the sale of coupons. For example, as shown in FIG. 5b, in one scenario volunteers may sell coupons 10 for donations to the charity function. Each coupon 10 may typically include an auction title or announcement 2, a denomination amount 4, an identification mark 6, a raffle announcement 3, an auction timeframe or period 5, an auction website address 8, and miscellaneous information 7 concerning terms of the auction. The identification mark 6 may comprise an alpha-numeric number or, preferably a bar code indicator as depicted in FIG. 5b. The identification mark 6 is used to establish a link with the online auction. The denomination amount 4 may be fixed or varied depending on the auction. For example, one auction may offer coupons having a single denomination amount of $10, while another auction may offer have denomination amounts of $5, $10, and $20. Regardless, the denomination amount 4 is linked with the identification mark 6 so that a coupon receives its proper credit in the system. The auction timeframe 5 informs the purchaser the time frame in which the auction will be conducted. The auction website address 8 informs the purchaser of the online website that will display the auction during the assigned timeframe 5.

Figure 6:
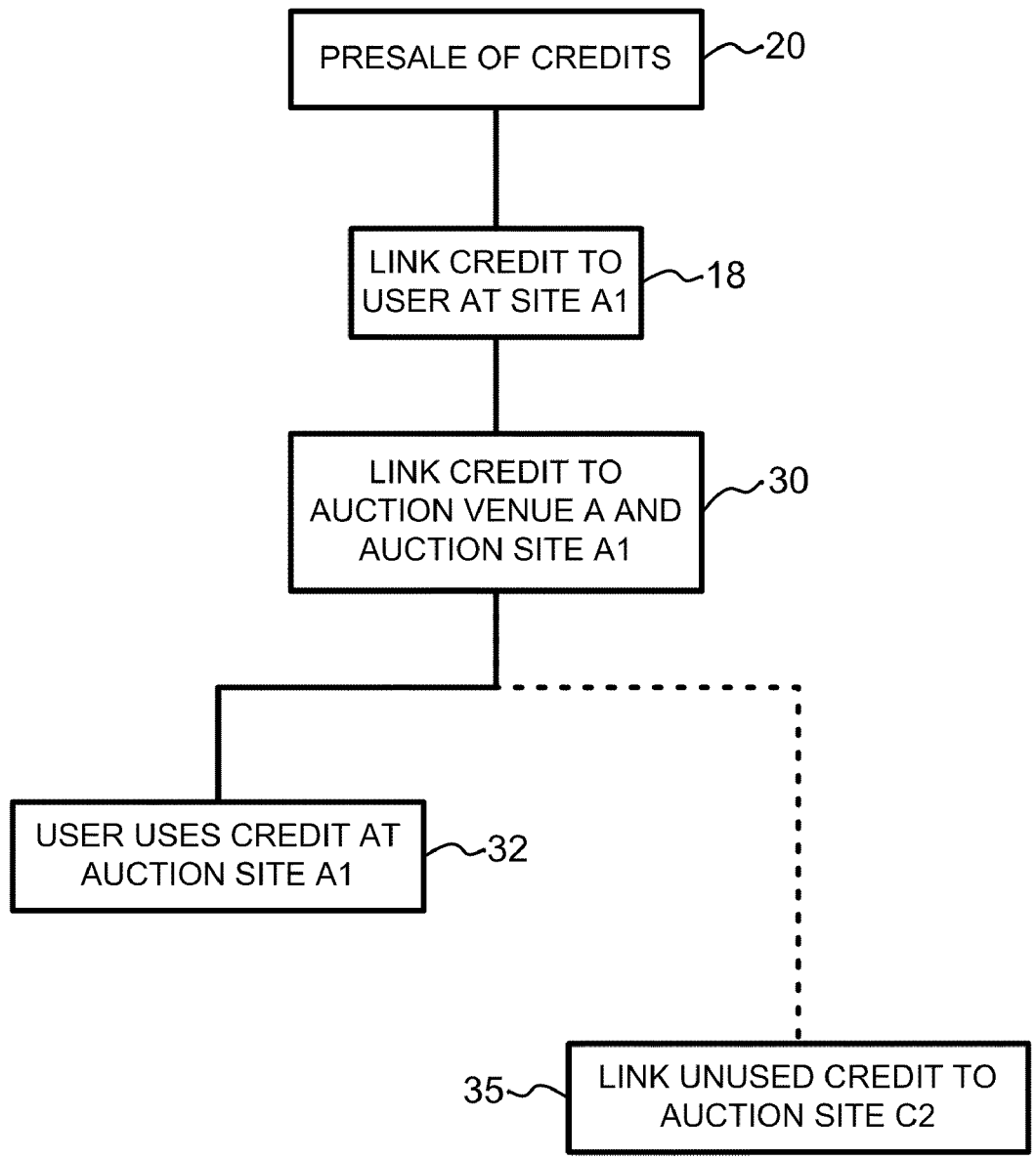
FIG. 6 illustrates a flowchart of the sale and assignment of auction credits to an auction site in accordance with the method and system of the present invention.

With reference now to FIG. 6, while auction credits may be purchased at any time up to the expiration of the auction time period, auction credits are typically presold prior to the auction period. Each presale of credit 20 is registered and recorded into the system and the credit amount is linked to a specific user at a particular auction site 28. The credit purchase is also linked to a specific auction venue to which the auction site is affiliated. Thus, the purchaser of the auction credit is able to use the credit value at the particular auction site to which it pertain. The credit typically expires when the auction ends. However, the unused credit may alternatively be linked to another auction site 25 for subsequent use.

Figure 7:
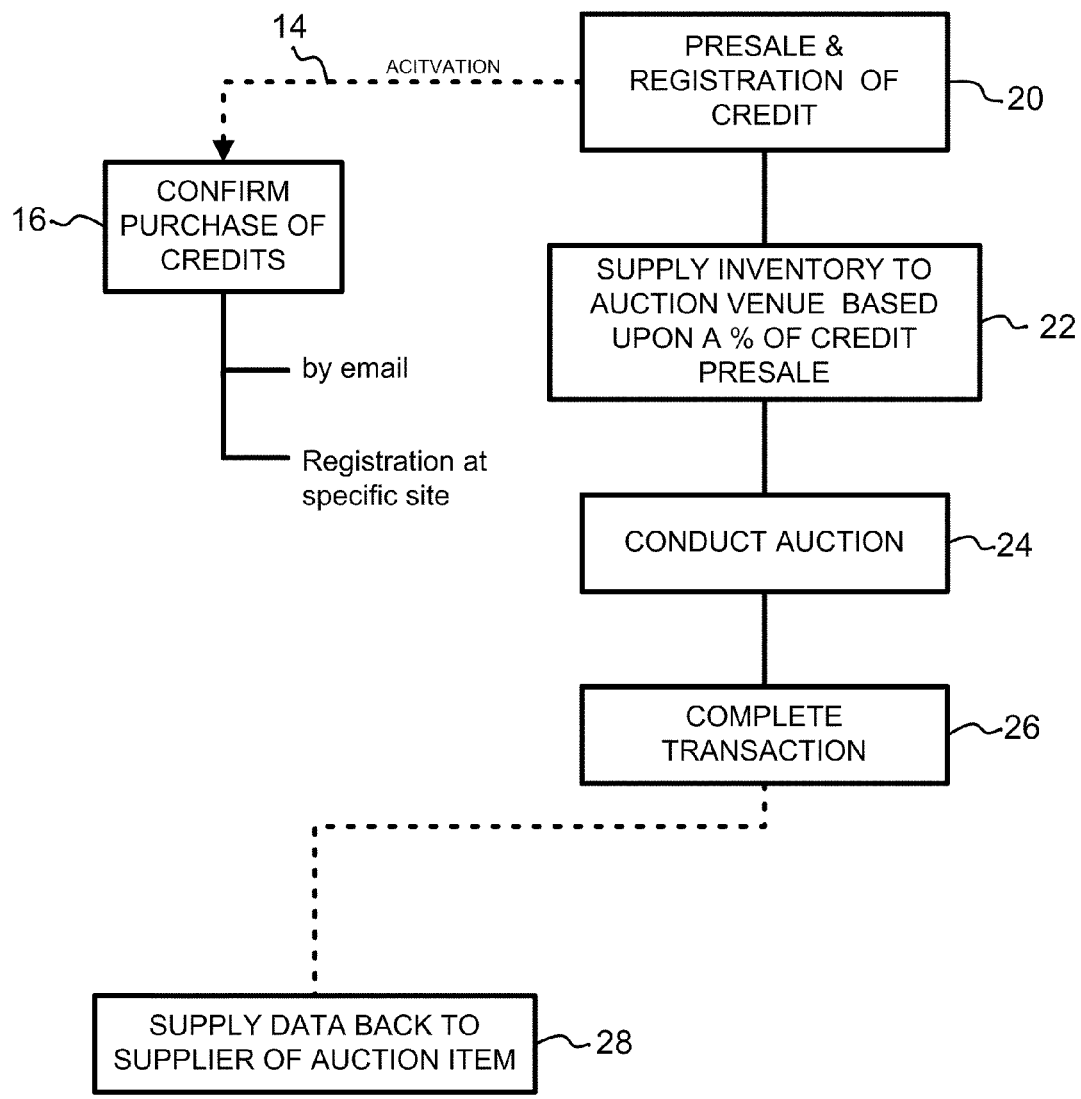
FIG. 7 illustrates a flowchart of the sale and assignment of auction credits to a specific user for a specific auction venue of auction credits in accordance with the method and system of the present invention.

A key feature of the present invention is that volunteers are essentially only required for the presale of the credits 20. Once the credits are sold and the money turned in, the auction is conducted fairly autonomously. For example, as shown in FIG. 7, upon registration of the presale of an auction credit 20 in the system, the credit is activated 14 and the system sends a confirmation to the purchaser 16 via regular or e-mail. Alternatively, the system may also allow users to purchase, register and activate credits through an online site.

Another key feature of the present invention is that items up for auction are provided from a centrally controlled inventory of merchandise that is offered for liquidation sale. Suppliers and sellers provide inventory to a centralized auction network controller that has overall control of the auction system of the present invention. For example, in the embodiment depicted in FIG. 1 a single seller 110 is tasked with assembling a single inventory of goods and services from a plurality of suppliers 102, 104, 106. Alternatively, in the embodiment depicted in FIG. 2, a plurality of supplier/sellers (e.g., 202, 204, 206) are tasked with assembling and maintaining separate inventories (e.g., 202a, 204a, 206a) of goods and services available for auction. It is understood that each supplier/seller may assemble its separate inventory for one or more providers of goods and service under separate contractual arrangements. It is further understood that each supplier/seller may supply either a single item of merchandise or multiple items of merchandise having the same or differing characteristics.

In accordance with the previously disclosed method of the present invention, merchandise items from each seller's inventory are registered with the auction network controller 120. The network controller 120 generates an inventory data file on each merchandise item that includes a registration mark (e.g., a number or alpha-numeric symbol) and at least one characteristic defining the item. The inventory data file is stored in the scheduling database 160. Once an auction item has been registered with the auction network controller 120 and its characteristics catalogued in an inventory data file in the scheduling database 160, the auction network controller 120 performs an algorithm which determines which auction items are sent to which auction venues. The algorithm analyzes and correlates the inventory characteristics of the auction items with the design parameters of available auction venues to identify the auction venue which best suits the characteristics of the auction item so as to maximize its yield in the shortest possible time. In addition, the auction network controller 120 may also use external and historical data in its analysis regarding the correlation of the inventory characteristics with the venue design parameters.

In addition, the auction network controller 120 can identify and reserve sets or lots of inventory data files for distribution to the various auction venues. Thus, each auction item is evaluated not only in terms of its compatibility and correlation with the parameters of the auction venue, but also in relation to its compatibility and correlation with the total mix of merchandise inventory supplied to an auction venue. Thus, the auction network controller 120 is able to control the mix of inventory items supplied to each auction venue to maximize sales yield and generate the highest rate of sale.

The auction network controller 120 further controls the supply of auction merchandise to each of the available auction venues. In a preferred embodiment of the system of the present invention, the network controller 120 supplies auction inventory to each auction venue based upon a percentage of the total presale credits assigned to each auction site associated with a particular auction venue. For example, as illustrated in FIGS. 1, 2 and 4, the network controller 120 identifies inventory data files in its scheduling database 160 which correlate favorably with the parameters of specific auction venues. One auction venue 130 has a single associated auction site 132, while another auction venue 140 has two associated auction sites 142, 144. Still another auction venue 150 has a plurality of n associated auction sites 152, 154, . . . 156.

In accordance with the teachings of the present invention, the proceeds from the presale of credits are registered and recorded as credit data files 166 into the system. Upon receipt of the credit data file 166, the network controller 120 confirms the purchase of the credits with the purchaser/bidder and credits the bidder's account for use at a specific auction website. The network controller 120 further assigns the credited amounts to a specific auction venue. Thus, credit data 166 regarding the presale of credits is submitted to the auction network controller 120, which systematically links the credited amount to a specific user at a particular auction site. The credit amount is correspondingly linked to the specific auction venue with which the auction site is affiliated.

For example, as shown in the Figures, credit data assigned to auction site A1 132 is linked only to auction venue A 130. Likewise, the credit data assigned to auction sites B1 142 and B2 144 are linked only to auction venue B 140. Similarly, the data assigned to auction sites C1 152, C2 144 and Cn 156 are linked only to auction venue C 150. Since inventory is preferably supplied to each auction venue based upon a percentage of credit presale 32 at each of the venue's associated websites, as more auction credits are sold and assigned to specific auction sites, the quality and quantity of the auction merchandise supplied their related auction venues improves.

In addition, the credit presales from a plurality of auction sites can be pooled together under a single venue to form a larger inventory of goods than would otherwise be possible. Thus, smaller auctions may be gathered under a common venue, which is then able to offer a substantially larger inventory of goods for auction.

The actual auction is conducted 24 at the various auction sites (e.g., 142, 144) associated with a particular auction venue (e.g., 140). The participants at the one or more auction sites may submit bids on the auction item until it is sold or the auction expires. The participants or bidders use their previously purchased auction credits to bid on merchandise distributed to the venues. The bidders submit their bids through their specific auction site. The bids are transmitted from each auction site to its respective auction venue where it is re-transmitted to all associated auction sites. Real time bidding information may also be transmitted from the various auction venues back to the network controller 120 where it is used to adjust the algorithm and continually update the historical database 162.

Upon completion of the auction, the winning bidder is notified and informed where and how to complete the transaction. The network controller 120 serves as the information and accounting nexus between the winning bidder and the seller of the auction item. The transaction is completed 26 by transferring the credits from the winning bidder's account to the centralized auction controller 120 which apportions the credits amongst itself, the supplier/sellers who supplied the auction item and the specific auction organizers in accordance with a prearranged agreement. It is understood that the pre-arranged agreement can be formulated in many ways. For example, the parties involved may share on a fixed percentage basis or a fixed fee arrangement may apply to one or more of the parties. Alternatively, the auction organizers might opt to hold back a fixed portion of proceeds generated by the presale of auction credits in lieu on any apportionment after the completion of the auction.

It will now be evident to those skilled in the art that there has been described herein an improved computerized system and method for conducting electronic online auctions involving pre-sale of auction currency drafts of the present invention. Although the invention hereof has been described by way of a preferred embodiment, it will be evident that other adaptations and modifications can be employed without departing from the spirit and scope thereof. For example, some of the steps in the system procedure could be conducted manually in addition to those conducted electronically. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A computer-implemented method for conducting a multi-site auction supplied from a source of inventory, comprising the steps of:
    (a) establishing in a computerized common controller processor and memory a plurality of auction venues autonomous of one another but under the control of said computerized common controller processor and memory, wherein each of said plurality of auction venues is connected to one or more affiliated auction websites, which each permit a unique set of participants to access auctions generated by its respective auction venue;
    (b) establishing in said computerized common controller memory a unique set of parameters for each auction venue, wherein each set of parameters delineates a distinct marketing framework for each auction venue;
    (c) establishing an inventory comprising a plurality of items;
    (d) generating a data file in said computerized common controller memory for each of said plurality of items in said inventory, each said data file including a registration mark and at least one characteristic of said item;
    (e) selling an auction currency draft to a first participant, wherein said draft is registered in said computerized common controller memory and assigned by said computerized common controller processor to a first auction venue and one of said at least one affiliated auction website;
    (f) selecting with said computerized common controller processor and memory a data file for said first auction venue based upon an algorithm, which correlates said item characteristics in said data file with said unique set of parameters for said first auction venue;
    (g) distributing said data file to said first auction venue with said computerized common controller processor and memory based upon a percentage of the total amount of auction currency drafts assigned to said first auction venue; and
    (h) conducting an auction at said first auction venue from said at least one auction website affiliated with said first auction venue, wherein said first participant enters bids with previously purchased auction security drafts.

2. The method of claim 1, wherein each said auction security draft includes an auction value portion which is used by said first participant to enter bids in said auction and an auction raffle portion; the method further comprising:
    (i) conducting a raffle at said auction venue from said at least one auction website affiliated with said first auction venue, wherein said first participant participates in said raffle with auction raffle portion of previously purchased auction security drafts.

3. The method of claim 1, wherein said inventory is established by a plurality of sellers.

4. The method of claim 1, wherein each of said auction websites has a unique graphical appearance.

5. The method of claim 1, wherein said algorithm further comprises analyzing historical sales data and external data.

6. The method of claim 5, wherein said historical sales data is generated by said plurality of venues.

7. The method of claim 5, wherein said algorithm further comprises analyzing real time sales data generated by said plurality of venues.

8. A computer-implemented method for conducting a multi-site auction supplied from a source of inventory, comprising the steps of:
    (a) establishing in a computerized common controller processor and memory a plurality of auction venues autonomous of one another but under the control of said computerized common controller processor and memory, wherein each of said plurality of auction venues is connected to one or more affiliated auction websites, which each permit a unique set of participants to access auctions generated by its respective auction venue;
    (b) establishing in said computerized common controller memory a unique set of parameters for each auction venue, wherein each set of parameters delineates a distinct marketing framework for each auction venue;
    (c) establishing an inventory comprising a plurality of items;
    (d) generating a data file in said computerized common controller memory for each of said plurality of items in said inventory, each said data file including a registration mark and at least one characteristic of said item;
    (e) selling an auction currency draft to a first participant, wherein each auction currency draft includes an auction value portion and an auction raffle portion, and wherein said draft is registered in said computerized common controller memory and assigned by said computerized common controller processor to a first auction venue and one of said at least one affiliated auction website;

(f) selecting with said computerized common controller processor and memory a first set of data files from said inventory for said first auction venue based upon an algorithm, which correlates said item characteristics in said data file with said unique set of parameters for said first auction venue;

(g) distributing said first set of data files to said first auction venue with said computerized common controller processor and memory based upon a percentage of the total amount of auction currency drafts assigned to said first auction venue; and (h) conducting an auction at said first auction venue from said at least one auction website affiliated with said first auction venue, wherein said first participant enters bids with auction value portion of previously purchased auction security drafts.

9. The method of claim 8, wherein said algorithm restricts the distribution of data files having identical characteristics to the same auction venue.

10. The method of claim 9, further comprising
(i) selecting with said computerized common controller processor and memory a second set of data files from said inventory for said first auction venue based upon an algorithm, which correlates said item characteristics in said data file with said unique set of parameters for said first auction venue;
(j) distributing said second set of data files to said first auction venue with said computerized common controller processor and memory based upon the percentage of the total amount of auction currency drafts assigned to said first auction venue; and;
(k) conducting a second auction at said first auction venue from said at least one auction website affiliated with said first auction venue, wherein at least one of said participants enters bids with previously purchased auction security drafts.

11. The method of claim 10, wherein said step of selecting said second set of data files comprises an analysis by said computerized common controller processor and memory of historical sales data generated by auction of said first set of data files.

12. The method of claim 8, further comprising:
(i) conducting a raffle at said first auction venue from said at least one auction website affiliated with said first auction venue, wherein said first participant participates in said raffle with auction raffle portion of previously purchased auction security draft.

13. A computerized system for supplying a multi-site auction, comprising:
(a) an inventory that includes a plurality of items offered by a seller;
(b) a computerized network controller processor and memory in communication with said seller; said network controller processor and memory having a catalog database comprising a data file on each of said plurality of items, each said data file including a registration mark and at least one characteristic of said item;
(c) a plurality of auction venues autonomous of one another but in communication with said computerized network controller processor and memory, wherein each of said auction venues has a unique set of operating parameters which are controlled by said computerized network controller processor and memory; and
(d) a plurality of auction websites, wherein each of said auction websites is affiliated and in communication with only one of said plurality of auction venues, each of said plurality of auction websites having a display which is linked to its respective auction venue that permits a unique set of participants to access auctions generated by its respective auction venue; and
(e) a plurality of auction currency drafts purchased by individual participants for use in placing bids on items of inventory displayed on auction websites linked with auction venues;
wherein said computerized network controller processor and memory selects each data file for a first auction venue based upon an algorithm performed by said computerized network controller processor and memory that correlates said item characteristics in each said data file with said unique set of parameters said first auction venue, and
wherein said computerized network controller processor and memory distributes said data files to said first auction venue based upon a percentage of the total amount of auction currency drafts assigned to said first auction venue.

14. The system of claim 13, wherein said seller comprises a plurality of sellers, each of said plurality of sellers having a discrete line of communication with said computerized network controller processor and memory.

15. The system of claim 13, wherein each of said auction websites has a unique graphical appearance.

16. The system of claim 13, wherein said computerized network controller processor and memory further comprises a historical sales database and an input for external data, and wherein said algorithm further comprises analyzing said historical sales data and external data.

17. The system of claim 16, wherein said historical sales database generates its data from sales data generated by said plurality of venues.

18. The system of claim 17, wherein said computerized network controller processor and memory further comprises an input for real time sales data generated by said plurality of venues and wherein said algorithm further comprises analyzing real time sales data.

19. The system of claim 13, wherein said computerized network controller processor and memory selects a first set of data files from said inventory and distributes each of said first set of data files to a single auction venue amongst said plurality of auction venues based upon a percentage of the total amount of auction currency drafts assigned to said first auction venue.

20. The system of claim 13, wherein each auction currency draft includes an auction value portion and an auction raffle portion.

* * * * *